United States Patent Office 3,746,575
Patented July 17, 1973

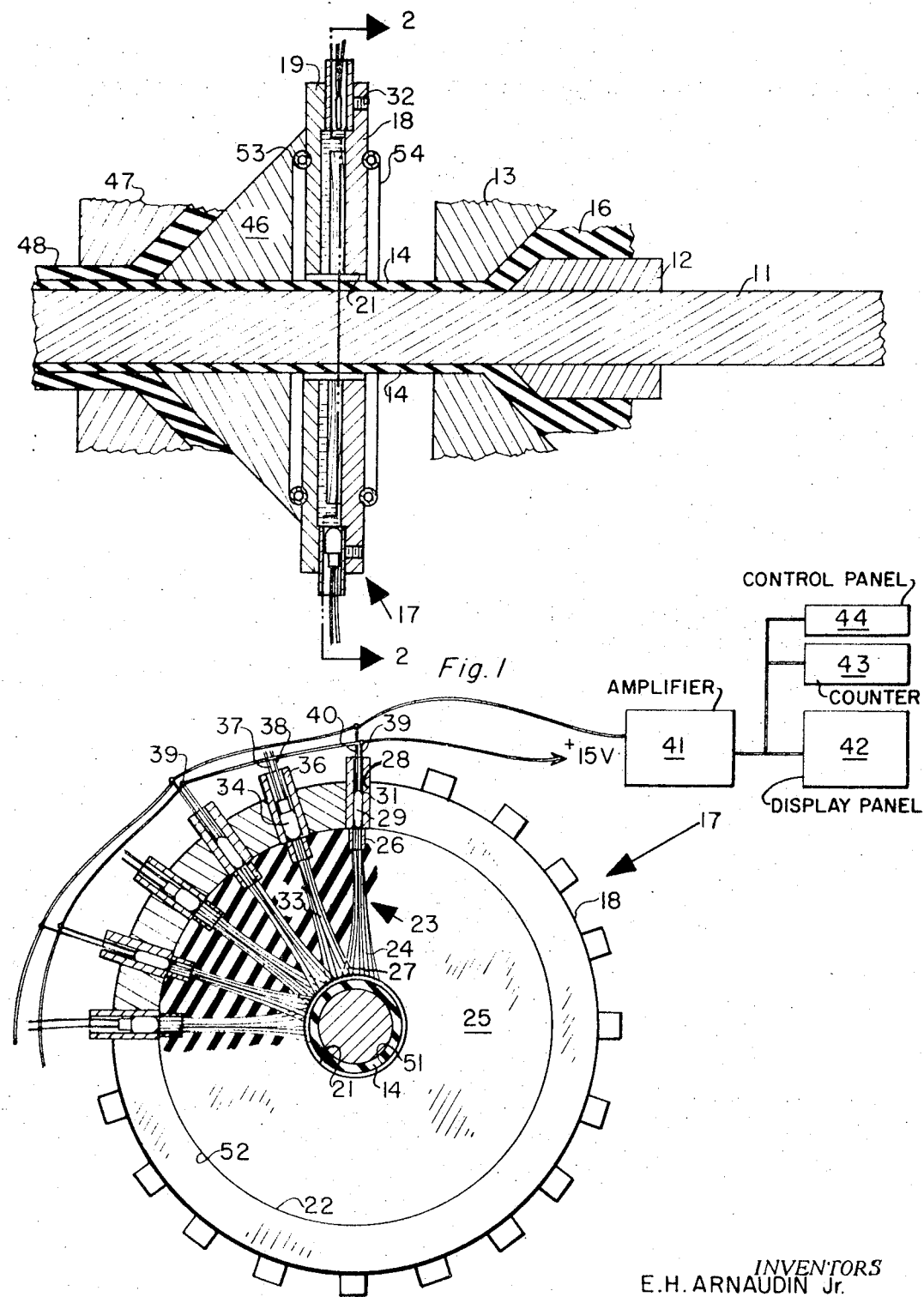

3,746,575
METHOD OF DETECTING HOLIDAYS DURING DUAL EXTRUSIONS
Edwin H. Arnaudin, Jr., Marion, Wilbert H. Christiansen, Indianapolis, and Robert M. Hazelett, Jr., Marion, Ind. (all % Anaconda Wire and Cable Company, 605 3rd Ave., New York, N.Y. 10016)
Original application Nov. 4, 1969, Ser. No. 873,811. Divided and this application July 21, 1971, Ser. No. 164,543
Int. Cl. G01n 21/32; B44d 1/18
U.S. Cl. 117—218
2 Claims

ABSTRACT OF THE DISCLOSURE

An apparatus and a method for the detection of holidays in the wall of a coating on a curved elongated surface, such as that of an electrical conductor strand, employs light-transmitting fibers, distributed around the strand, to transmit both the illumination and the reflected light.

CROSS-REFERENCE TO RELATED APPLICATION

This application is a division of application Ser. No. 873,811, filed Nov. 4, 1969, now Patent 3,626,196.

BACKGROUND OF THE INVENTION

In the manufacture of elongated articles such as electric cables where a polymeric coating is continuously applied over a metallic surface such as by hot extrusion, it is important to know as soon as possible if there are discontinuities such as pinholes, or holidays in the coating, and electrical probing methods, have, in the past been used to test for holidays, where the coating was dielectric. When it is desired to test for discontinuities as close to the point of extrusion as possible the coating may be too soft to permit physical contact, and also, if the coating is not dielectric, or not dielectric when hot, electrical methods of testing for holidays are not appropriate. This is particularly true for the application of extruded semiconducting strand shielding on the conductors of high voltage cables. Here the coated conductor may pass almost immediately, and without cooling, into an insulation extrusion head, so that if a fault in the first coating is not corrected rapidly, a great quantity of expensive scrap may be generated.

SUMMARY OF THE INVENTION

We have found that an optical apparatus of our invention can be used to detect holidays even though the coating is applied to a curved surface and has such appreciable thickness that light rays with a low angle of incidence might not be expected to be detectable before being absorbed in the wall of a small hole or holiday. Our apparatus for detecting holidays in a coating of appreciable thickness on a curved surface of an elongated article comprises means for supporting a large plurality of optical fibers disposed radially completely around the article in such a manner that the ends of the fibers face the article in an area that includes all the circumferential points on the surface. It also comprises completely illuminating the area through a first portion of the fibers and means sensing the reflection from the surface through a second portion of the fibers. Preferably substantially all of the fibers of the second portion are so positioned that they receive illumination reflected from at least one fiber of the first, illuminating, portion in substantially the same lengthwise radial plane. In an important embodiment of our invention the illuminating means is comprised of a plurality of lamps and the sensing means comprises a plurality of photo-electric cells, radially distributed around the article.

Our invention has particular application for making electric cables wherein our apparatus for applying a dual extrusion over a cable conductor will comprise a first die means continuously extruding a first layer of polymeric material over the conductor, a first large plurality of optical fibers radially disposed around the conductor downstream of the die means, and means illuminating the coating through the fibers. A second large plurality of optical fibers are radially disposed around the conductor so as to receive illumination reflected from the conductor through any holidays in the coating, and sensing means communicate with these fibers to sense these holidays. Downstream of the fibers, second die means continuously extrude a second layer of polymeric material over the first layer.

In our method of applying a dual extrusion over an electrical cable conductor we comprise the steps of continuously extruding a thin but appreciable layer of semiconducting polymeric material at elevated temperature over the conductor, illuminating the surface of the layer through optical fibers while it is still hot, and sensing any holidays in the layer, also through optical fibers. Directly thereafter, we extrude a thick layer of dielectric polymeric material over the semiconducting layer.

BRIEF DESCRIPTION OF THE DRAWINGS

FIG. 1 shows a side view, partly in section, of apparatus of our invention.
FIG. 2 shows a section through the line 2—2 of FIG. 1.

DETAILED DESCRIPTIONS OF A PREFERRED EMBODIMENT

The figures show an embodiment of our invention as applied to cable insulating where a metallic conductor 11 which may be a solid rod or made up of a plurality of individual strands in a known manner and which may be hot, due to a preheating treatment, not shown, is directed by a guider 12 into a die 13 where a layer or coating 14 of a polymeric composition 16 is applied. In the illustrated case the composition 16 is semiconducting and serves as "strand shielding" since it has the property of making a void-free interface with a layer of dielectric material to be applied. The thickness of the layer 14 is appreciable but it is thin enough (2–15 mils) to admit a possibility of holidays or pinholes when it is applied at high speed. After leaving the die 13 the coated conductor passes directly through a member 17 for the detection of any holidays, pin-holes, or interruptions in the application of the coating 14. The structure of the member 17 can best be seen in FIG. 2.

The member 17 is formed of matching circular plates 18, 19 having a central opening 21 for the passing without contact, of the conductor 11 covered with the coating 14. The plate 18 is recessed at 22 to receive a plastic molding or casting 25 wherein a plurality of bundles 23, each comprising a large plurality of optical fibers 24 are each positioned radially from a cylindrical ferrule 26 encapsulated at the perimeter of the casting 25 to a flattened spread 27 terminating at an opening in the casting 25 matching the opening 21. The plate 18 is bored at spaced intervals with recesses 28, and the casting 25 is fitted into the recess 22 so that each of its ferrules 26 centers on a recess 28 into which has been fitted a light sensing cell 29 protected by a casing 31 which is secured in the recess 28 by means of a set screw 32. Optical fibers suitable for the fibers 24 are commercially available and do not constitute a novel feature of the present invention. Corning Glass No. 5013 (2.5 mil) fibers have been found satisfactory in the embodiment of FIGS. 1 and 2. Photo-electric cells suitable for use as the light sensing cell 29 are commercially known and we have used diodes available from the Texas Instrument Company as catalog No. LS-488 in the embodiment herein described.

The bundles 23 have their spreads 27 disposed to surround the entirety of the opening 21 over a narrow area and another plurality of bundles 33 with their ferrules opening on lamps 34 protected by casings 36 fitted into alternate of the recesses 28 are spread out at the opening 21 to completely surround the opening in an area directly behind the area covered with the spreads 27. We have found that lamps commercially available from the General Electric Company under the designation 253X are suitable for use as the lamps 34. With the plate 19 bolted to the plate 18 to hold the casting 25 in place, and leads 37, 28 of the lamps 34 supplied from a suitable electric power source in a known manner, leads 39 from the cathodes of the diodes 29 are interconnected and connected to a positive 15 volt supply. Leads 40 from the anodes of the diodes 29 are also interconnected, amplified by photocell signal amplifier 41 and thence connected to a signal display panel 42, counting device 43, control panel 44 which comprises conventional means for signalling any malfunction of the application of the coating 14 or automatically controlling or stopping the extrusion operation in response to the number or frequency of holidays. Appropriate amplification, counting and control mechanisms are commercially available to respond to the sensing of the diodes 29.

After leaving the member 17 the coated conductor 11 passes directly through a guider 46 into a die 47 where it is insulated with a heavy wall 48 of dielectric polymeric material. Although we have illustrated an application where the guider 46 is directly downstream of the member 17 it will be understood that our invention is not limited to this juxtaposition and will have utility where the two extrusions are widely separated.

Where the holidays in the coating 14 are small, in the order of magnitude of the coating thickness itself, the advantage of the disposition of the fibers of bundles 23 and 33, so that each covers an area surrounding the entire circumference of the aperture 21 but in a different lengthwise section, becomes evident, since the angle of incidence of the reflected beam is greater from a straight length than it would be from a curved length of the reflecting surface, and there is greater assurance that light transmitted from fibers in bundles 33 will be picked up by the fibers in bundles 23 inasmuch as, if any lengthwise radial plane (a plane through the center of the conductor and including a conductor radius) is considered, having significant thickness, there will be at least one illuminating and one sensing fiber in that plane. This might also be accomplished by thoroughly mixing all the spread fiber ends before encapsulation, but by separating the ends of the bundles 23 and 33 into adjacent planes a positive assurance of a proper distribution is more readily obtained.

Although we have illustrated an embodiment with an alternate distribution of lamps and photocells it will be understood that other combinations and arrangements may be used within the scope of our invention. For example, the member 25 may be divided into quadrants with two lamps and three photocells in each quadrant resulting in a total of 12 photocells and 8 lamps. In this case each lamp and photocell is associated with a fiber bundle as described and the bundles of each group are spread to surround the entire circumference of the conductor.

In the practice of our invention, inner and outer cylindrical surfaces 51, 52 are ground smooth, the member 25 is inserted in the recess 22 and the plate 19 bolted to the plate 18. The casings 36 and 31 are inserted in recesses 28 and the leads 37, 38, 39, 40 are connected to the circuitry. The conductor is threaded through the dies 13 and 7 of the extruding machine and the opening 21. The circuits are energized to supply voltage to the leads 39 and light the lamps 34. Cooling tubes 53, 54 serve to cool the member 17 when the heat of extrusion requires it and valves (not shown) to the water or oil supply to these tubes are now opened. Thereafter, extrusion is begun and any defect in the extrusion of the coating 14 will be signalled, counted, and/or serve to stop or control the extrusion process according to established procedures for responding to electrical signal impulses.

The description hereinabove given has been exemplary rather than definitive and we desire an award of Letters Patent for our invention as defined in the following claims.

What is claimed is:
1. The method of applying a dual extrusion over an electric cable conductor comprising the steps of:
   (a) continuously extruding a thin but appreciable layer of semiconducting polymeric material at elevated temperature over said conductor,
   (b) illuminating the surface of said layer through optical fibers while said layer is still at elevated temperature,
   (c) sensing any holidays in said layer through optical fibers and signalling the occurrence of said holidays so as to initiate stoppage of said dual extrusion, said holidays being excessive, and
   (d) directly extruding a relatively thick layer of dielectric polymeric material over said semiconducting layer.

2. The method of claim 1 wherein said surface is illuminated and second through fibers in substantially the same radial planes.

References Cited
UNITED STATES PATENTS

| | | | |
|---|---|---|---|
| 3,541,228 | 11/1970 | Lombardi | 117— 218 X |
| 3,096,210 | 7/1963 | Boonstra | 117—218 X |
| 3,482,033 | 12/1969 | Kenney et al. | 117—218 X |
| 3,479,446 | 11/1969 | Arnaudin et al. | 117—218 X |
| 3,453,440 | 7/1969 | Muri et al. | 250—227 |
| 3,430,055 | 2/1969 | Metzger | 250—227 X |
| 2,895,373 | 7/1959 | Eyraud | 250—219 SX |
| 3,496,373 | 2/1970 | Thorman et al. | 250—219 X |

RALPH HUSACK, Primary Examiner

U.S. Cl. X.R.

117—66, 128.4; 118—9; 250—219 S, 227; 356—237

UNITED STATES PATENT OFFICE
CERTIFICATE OF CORRECTION

Patent No. 3,746,575　　　　　　　　　　Dated　July 17, 1973

Inventor(s)　Edwin H. Arnaudin

It is certified that error appears in the above-identified patent and that said Letters Patent are hereby corrected as shown below:

Change　　Assignee to read:

--The Anaconda Company--

Signed and sealed this 12th day of February 1974.

(SEAL)
Attest:

EDWARD M. FLETCHER, JR.　　　　C. MARSHALL DANN
Attesting Officer　　　　　　　Commissioner of Patents